United States Patent
Senci et al.

(10) Patent No.: US 10,825,012 B1
(45) Date of Patent: Nov. 3, 2020

(54) SYSTEMS AND METHODS FOR SCORING CHARGEBACK DISPUTES

(71) Applicant: MasterCard International Incorporated, Purchase, NY (US)

(72) Inventors: David J. Senci, Troy, IL (US); Kyle Williams, Wentzville, MO (US); Johan Gerber, Wildwood, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 310 days.

(21) Appl. No.: 15/680,026

(22) Filed: Aug. 17, 2017

(51) Int. Cl.
| | | |
|---|---|---|
| G06Q 20/40 | (2012.01) | |
| G06Q 40/02 | (2012.01) | |
| G06Q 20/24 | (2012.01) | |
| G06N 5/02 | (2006.01) | |
| G06N 7/00 | (2006.01) | |

(52) U.S. Cl.
CPC ............ G06Q 20/24 (2013.01); G06N 5/022 (2013.01); G06N 7/005 (2013.01)

(58) Field of Classification Search
CPC .............................. G06Q 20/40; G06Q 40/02
USPC ........................................................ 705/39
See application file for complete search history.

(56) References Cited

U.S. PATENT DOCUMENTS

| | | | |
|---|---|---|---|
| 2002/0095360 A1* | 7/2002 | Joao | G06Q 20/04 705/30 |
| 2002/0139837 A1* | 10/2002 | Spitz | G06Q 20/10 235/375 |
| 2004/0030644 A1 | 2/2004 | Shaper | |
| 2014/0279500 A1* | 9/2014 | Larko | G06Q 30/016 705/44 |
| 2015/0220920 A1 | 8/2015 | Howe | |
| 2016/0300214 A1 | 10/2016 | Chaffin et al. | |
| 2017/0053278 A1 | 2/2017 | Gerard et al. | |
| 2017/0178134 A1 | 6/2017 | Senci et al. | |

* cited by examiner

*Primary Examiner* — Hai Tran
(74) *Attorney, Agent, or Firm* — Armstrong Teasdale LLP

(57) ABSTRACT

A dispute scoring computing device for generating chargeback dispute scores is provided. The dispute scoring computing device extracts historical transaction data and account profile data for a plurality of transactions associated with an account, and generates a chargeback dispute prediction model for the account based on the extracted data. The dispute scoring computing device further receives a candidate chargeback for a transaction initiated with a merchant using the account, extracts transaction data from the candidate chargeback, and determines, using the generated chargeback dispute prediction model, a chargeback dispute score indicating a likelihood that the candidate chargeback, if disputed by the merchant, would result favorably for the merchant.

19 Claims, 8 Drawing Sheets

US 10,825,012 B1

SYSTEMS AND METHODS FOR SCORING CHARGEBACK DISPUTES

BACKGROUND

This disclosure relates to payment account networks and, more specifically, to network-based systems and methods for rating the likelihood of a merchant winning a chargeback dispute.

When a user of an account, such as an account associated with a payment card (e.g., a credit card or a debit card), authorizes a transaction to purchase goods or services from a merchant using the account, an acquiring bank (i.e., a merchant bank) reimburses the merchant for the transaction. The acquiring bank then settles those funds with an issuing bank (issuer) of the account corresponding to the payment card or with a third party processor authorized to act on behalf of the issuing bank by presenting the transaction into a transaction payment network. In a process known as clearing, transaction data is moved from the acquiring bank to the payment network, and from the payment network to the issuing bank. After clearing, settlement of the final payment occurs. Settlement is a process used to exchange funds between the acquiring bank and the issuing bank (or third party processor) for the net value of a batch of all monetary transactions that have cleared for that processing day.

On occasion, the consumer or the issuer may not recognize the purchase when it is presented to them, and therefore, they may determine the purchase is fraudulent or may otherwise dispute the transaction. In some cases, the consumer may be unsatisfied with the goods or services provided by the merchant and may choose to return the goods. In these examples, the consumer may request a chargeback (also referred to as a first presentment, or simply a presentment) from the issuing bank. The chargeback is used to return the funds to the account corresponding to the payment card. Generally, the issuing bank immediately issues a credit to the account for the amount of the transaction. The issuing bank then sends a chargeback request to an issuer processor, and the request is collected with other requests and submitted in a batch to the payment network for presentment to the acquiring bank. Each time a chargeback is initiated, the issuing bank must pay a fee to get the process started to determine which party will be left with the cost of the purchase of the item or services. Depending on the outcome, the cost of the transaction may be left with the account in question, the issuing bank, the acquiring bank, or the merchant.

The threat of the reversal of funds often forces merchants to provide quality products, helpful customer service, and timely refunds, among other things. However, a merchant may likewise dispute the chargeback (also referred to as a second presentment, or re-presentment) with the assistance of the merchant's acquiring bank. The issuing bank and the acquiring bank may then attempt to mediate the charge through the chargeback dispute process. The result is that the chargeback and chargeback dispute processes use valuable banking resources and cause additional processing time in order to resolve the chargeback dispute. Furthermore, if the issuing bank and the acquiring bank cannot come to an agreement on the chargeback dispute, the payment processor may have to step in and make a final decision, thus using additional valuable resources.

Therefore, in an effort to conserve time and resources, it may be beneficial for an issuer to submit a chargeback or a merchant and/or acquiring bank to dispute a chargeback only when it is determined that submitting the chargeback would be favorable to the issuer (i.e., the issuer will likely win any chargeback dispute) or disputing the chargeback will be favorable to the merchant (i.e., that the merchant/acquirer will likely win the chargeback dispute), respectively, and not be left with the entire cost of the transaction. Scoring a chargeback dispute and providing the score to issuers, merchants, or acquirers may improve on the current decisioning tools and help each decide which chargebacks are associated with a high probability of winning a chargeback dispute.

BRIEF DESCRIPTION OF THE DISCLOSURE

In one aspect, a dispute scoring computing device is provided. The dispute scoring computing device includes a processor in communication with a memory. The processor is programmed to extract historical transaction data for a plurality of payment transactions associated with an account, and to extract account profile data for the account used in the plurality of transactions, wherein the account profile data comprises historical chargeback dispute information for the plurality of transactions associated with the account. The processor is also programmed to generate a chargeback dispute prediction model for the account based on the extracted historical transaction data and the extracted account profile data, and to receive a candidate chargeback for a transaction initiated with a merchant using the account. The processor is further programmed to extract transaction data from the candidate chargeback, and to determine, using the generated chargeback dispute prediction model, a chargeback dispute score indicating a likelihood that the candidate chargeback, if disputed by the merchant, would result favorably for the merchant.

In another aspect, a method for scoring a chargeback dispute associated with a transaction is provided. The method is performed using a dispute scoring computing device including a processor in communication with a memory. The method includes extracting historical transaction data for a plurality of payment transactions associated with an account, and extracting account profile data for the account used in the plurality of transactions, wherein the account profile data comprising historical chargeback dispute information for the plurality of transactions associated with the account. The method also includes generating a chargeback dispute prediction model for the account based on the extracted historical transaction data and the extracted account profile data, and receiving a candidate chargeback for a transaction initiated with a merchant using the account. The method further includes extracting transaction data from the candidate chargeback, and determining, using the generated chargeback dispute prediction model, a chargeback dispute score indicating a likelihood that the candidate chargeback, if disputed by the merchant, would result favorably for the merchant.

In yet another aspect, a non-transitory computer-readable storage medium having computer-executable instructions embodied thereon is provided. When executed by a dispute scoring (DS) computing device including at least one processor coupled to a memory, the computer-executable instructions cause the DS computing device to extract historical transaction data for a plurality of payment transactions associated with an account, and extract account profile data for the account used in the plurality of transactions, wherein the account profile data comprising historical chargeback dispute information for the plurality of transactions associated with the account. The computer-executable instructions also cause the DS computing device to generate a chargeback dispute prediction model for the account based on the extracted historical transaction data and the extracted account profile data, and to receive a candidate chargeback for a transaction initiated with a merchant using the account. The computer-executable instructions further cause the DS computing device to extract transaction data from the candidate chargeback, and to determine, using the generated chargeback dispute prediction model, a chargeback dispute score indicating a likelihood that the candidate chargeback, if disputed by the merchant, would result favorably for the merchant.

BRIEF DESCRIPTION OF THE DRAWINGS

FIGS. 1-7 show example embodiments of the methods and systems described herein.

FIG. 1 is an example multi-party payment card processing system that may be used to provide data to the system described herein.

FIG. 2 is a block diagram of a chargeback dispute scoring (CDS) system including a dispute scoring (DS) computing device.

FIG. 4 illustrates an example configuration of a remote device for use in the system shown in FIG. 2.

FIG. 5 illustrates an example configuration of a server system for use in the system shown in FIG. 2.

FIG. 6 is a flowchart of an example process for providing a chargeback dispute score using the system shown in FIG. 2.

FIG. 7 is a diagram of components of an example computing device that may be used in the CDS system shown in FIG. 2.

Figure 1:
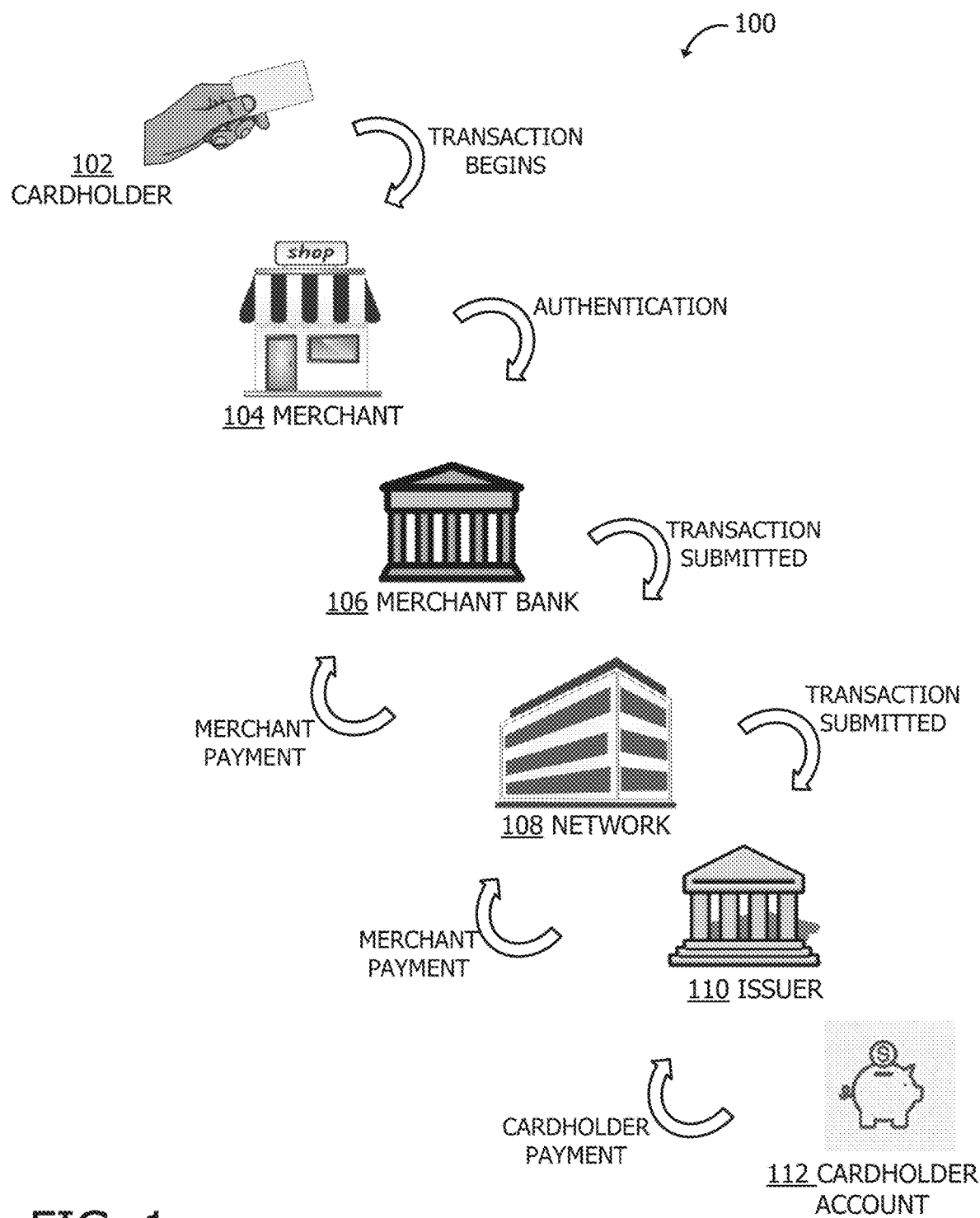

Like numbers in the Figures indicates the same or functionally similar components. Although specific features of various embodiments may be shown in some figures and not in others, this is for convenience only. Any feature of any figure may be referenced and/or claimed in combination with any feature of any other figure.

DETAILED DESCRIPTION OF THE DISCLOSURE

A chargeback occurs when either an issuer or a user of an account (i.e., a cardholder) indicates that a transaction charge be removed from the account and the funds from the transaction returned to the account. A few potential examples for granting chargebacks may include incorrect transaction amount, duplicate billing, a previously cancelled recurring payment being charged, transaction not permitted for the account, services not being rendered, credit not being processed, and fraudulent transactions, just to name a few. Each time a transaction is charged back, a payment processor of the transaction receives a record that explains why it was charged back (e.g., a reason code) as well as other details/features about the transaction. This record is further transmitted by the payment processor to the merchant/acquirer associated with the transaction, generally in the form of a chargeback message.

Issuers face a challenge when they are informed by a cardholder that a transaction charge is going to be challenged or should be removed from the account and the funds from the transaction returned to the account (i.e., to the cardholder). An issuer is often without sufficient knowledge to determine whether the stated reason for the chargeback is a valid one, particularly in instances wherein a cardholder asserts that services were not rendered, product was not deliverer, or the charge was the result of a fraudulent transaction.

Likewise, merchants/acquirers face a difficult decision when they receive chargebacks, also known as first presentments. The challenge they are faced with is determining which chargebacks they should re-present or challenge. When a merchant/acquirer re-present a chargeback they send it back to the issuer stating that in fact this transaction was legitimate or the chargeback reason code associated with the first presentment, from the issuer, was not valid. The merchants work with their acquirers and decide which first presentments they should re-present and this knowledge is based on the data they have about the transaction and their own historical data. However, the merchant/acquirer may be missing valuable insight into other aspects of the account, issuers, and other chargeback transactions.

Payment processing networks or chargeback networks (e.g., MasterCard, Visa, etc.) are in a unique position within the payment ecosystem to provide insight into the chargeback process to help issuers to determine which requested chargebacks (first presentments) should be sent to a merchant or acquirer and to help merchants decide which chargebacks (first presentments) that they should challenge (re-present). For instance, a payment processing network (or chargeback network) can identify trends and data factors, using their historical data, to help issuers and merchants to determine the likelihood of a chargeback outcome in order to avoid inefficiencies and a waste of resources for both issuers and merchants/acquirers. In particular, a payment processing network (or chargeback network) can identify trends and data factors, using their historical data, to help issuers determine when submitting a chargeback (first presentment) would be favorable to the issuer (i.e., the issuer will likely win the chargeback dispute) or to help merchants/acquirers decide which first presentments have a high probability of winning a re-presentment.

The embodiments described herein include a chargeback dispute scoring (CDS) system, a dispute scoring (DS) computing device, and methods for building a chargeback dispute prediction model that predicts the likely outcome of a chargeback dispute. In certain embodiment, the CDS system, the DS computing device, and the methods for building a chargeback dispute prediction model allows for prediction of the likelihood that disputing a particular chargeback will result in a successful outcome for the merchant/acquirer. In some cases, payment processors (such as payment networks) are capable of providing indicators to banks of how likely a transaction is fraudulent. However, there is currently no system capable of providing a score to issuers, acquiring banks, and/or merchants which indicates the probability of the outcome of a chargeback dispute (i.e., the probability of one or the other party winning a chargeback dispute). The systems and methods described herein resolve this deficiency.

According to one or more example embodiments, the dispute scoring computing device may be in communication with the payment processor. The dispute scoring computing device may consider information about a primary account number associated with a payment card including historical transaction data of the primary account number, including historical chargeback and dispute information, and the like, and generate a chargeback dispute prediction model which may be used to predict the likelihood of winning a particular chargeback dispute.

Notably, the dispute scoring methods (and, therefore, the related devices, systems, and computer-executable instructions) disclosed herein may be used for purposes of informing an issuer or a merchant/acquirer of the likelihood of succeeding in a chargeback dispute. Thus, while generally described herein in embodiments specific to a merchant/acquirer wherein information regarding the likelihood of success in disputing a chargeback (i.e., presentment or first presentment) is provided to a merchant/acquirer in a presentment or chargeback message for purposes of facilitating a decision of whether to re-present or dispute the chargeback, the concepts herein are equally applicable, mutatis mutandis, to methods of presenting the same or similar information to the issuer in response to a chargeback message for purposes of facilitating a decision of whether to proceed with the chargeback (i.e., whether to authorize the payment network to proceed with forwarding the chargeback message to the merchant/acquirer).

Described herein is the construction of a model that automatically scores each first presentment chargeback transaction. The score will indicate the probability of winning a re-presentment if the acquirer/merchant re-present (i.e., dispute) the first presentment back to the issuer. To this end, a transaction feature extraction component is created, which extracts the aforementioned factors from single transactions, and transforms them into binary, numeric, or categorical features. In addition, a card profiling table is used that stores variables calculated based on the transaction history of a card, for example, transaction velocity, chargeback history, etc. The card profiling is updated periodically. To avoid duplicating efforts, some of the variables can be taken from the long-term variables calculated for fraud scoring. After combining all the features, a comprehensive feature vector for each historical chargeback transaction can be created. Along with the historical chargeback data, a model is built using regularized logistic regression, to predict the probability of winning a re-presentment (i.e., the probability of the issuer not submitting an arbitration chargeback and the merchant will not be responsible to cover the cost of the chargeback transaction) if the acquirer/merchant were to re-present the first presentment back to the issuer. When a new chargeback comes in that may be a candidate for dispute/re-presentment, the feature extraction module is applied and combined with the extracted features and variables in the account profile. Subsequently, a score will be calculated using the model built based on the historical data. In addition, the model can help identify the most relevant features with respect to determining a dispute score, so that the model can be improved and made more efficient.

The resulting score can be presented to issuers in response to a chargeback message received by the payment processor or DS computing device. The issuer may then determine if it wishes to proceed with a chargeback. The resulting score can also be transmitted to acquirers/merchants as part of a chargeback dispute scoring service and applied to (e.g., embedded in) the first presentment chargeback message (from the issuer) to improve on their current chargeback decisioning tools. In the example embodiment, the chargeback dispute score is determined 'in flight' (i.e., without requiring retrieval of data from external sources when a candidate chargeback is received at the DS computing device) so that the score can be embedded into the chargeback message and forwarded from the DS computing device to the merchant. In some embodiments, an alert may also be included within embedded chargeback message along with the score. An alert may include an indicator or notification that the score has surpassed a particularly high or particularly low threshold value (e.g., less than 25% likely to succeed, less than 50% likely to succeed, more than 75% likely to succeed, more than 90% likely to succeed, etc.) according to a threshold rule or set of rules stored in the memory of the DS computing device. Supplementing the merchants with chargeback dispute scores improves their ability to more appropriately re-present chargebacks. In addition to providing a score for each candidate chargeback through the corresponding chargeback message, a score could be provided as an API for merchants (and/or issuers) to make a call into the payment networks on a case-by-case basis via the chargeback dispute scoring system described herein. The merchant would call out with specific information about their first presentment chargebacks and the original transaction. The chargeback dispute scoring system would then reply with a score that indicates how likely they are to "win" if they re-present (dispute) that first presentment (chargeback). In other words, the chargeback dispute scoring system scores a candidate chargeback to indicate a likelihood that the candidate chargeback, if disputed by the merchant, would result favorably for the merchant (i.e., that the merchant will not be responsible for the cost, either in whole or in part, of the original transaction associated with the candidate chargeback). By providing this modeling system, chargebacks (either at presentment or re-presentment stage) can be analyzed to determine a likelihood of success. By so doing, the methods and systems described herein help to reduce network traffic over the payment processing network (or chargeback network) by reducing the number of chargeback messages (presentments or re-presentments) by allowing parties to determine a likelihood of success before submitting such messages over the network.

In the example embodiment, the CDS system includes a dispute scoring (DS) computing device including and/or in communication with a payment network and a merchant/acquirer or requestor computing device (e.g., an issuer computing device). The DS computing device is configured to extract transaction data and account profile data for an account (i.e., a cardholder account) from a payment network, generate a chargeback dispute prediction model based on the extracted transaction and account profile data, receive a candidate chargeback to be scored, and determine a chargeback dispute score based on the candidate chargeback information and the generated model. The DS computing device is a specifically configured computing device that is capable of functioning as described herein, including a dedicated computing device associated solely with the CDS system. The DS computing device includes a processor in communication with a memory.

The CDS system further includes a database in wired and/or wireless communication with the DS computing device. In some embodiments, the database is a centralized database that is integral to the DS computing device, or in alternative embodiments the database is a separate component and external to the DS computing device. The database is accessible to the DS computing device and is configured to store and/or otherwise maintain a variety of information, as described further herein. For example, the database may store transaction-based data, account profile-based data, transaction-based factors, account profile-based factors, charge dispute prediction models, and/or any other information. The database is configured to store data to more efficiently retrieve data for model generation, model operation (i.e., chargeback dispute score generation), and dynamic model updating/refreshing. For instance, a generated model may be cached to the database and utilized 'in flight' (i.e., without requiring retrieval of data from external sources for score determination when a candidate chargeback is received at the DS computing device). Subsequently, based on the most recently received candidate chargeback and generated score, the model may be updated and re-cached to the database and ready for receipt of the next candidate chargeback.

In the example embodiment, the DS computing device is configured to extract transaction-related information about a plurality of transactions that have been authorized by a particular account over a given period of time (e.g., over the last 6 months, over the last 1 year, over the last 2 years, etc.). In some embodiments, the period of time may be determined manually by the merchant and/or acquirer or the requestor who will receive the associated chargeback dispute score. In some embodiments, the period of time may be determined automatically by the DS computing device. Table 1, below, shows various transaction data that may be extracted by a DS computing device for subsequent use in constructing a chargeback dispute prediction model. The transaction-based information listed in Table 1 may be characterized by various relevant transaction factors, and may be assigned a categorical type, binary type, or numerical type which may be used in rating/weighting each factor in the chargeback dispute prediction model.

TABLE 1

Factors used in scoring chargeback disputes include but are not limited to the following.

| Source | Factor | Description | Type |
|---|---|---|---|
| Transaction | Merchant Country | Country wherr the merchant is located | Categorical |
| Transaction | Merchant State | State where the merchant is located | Categorical |
| Transaction | Merchant City | City where the merchant is located | Categorical |
| Transaction | Merchant Location ID | Internal location ID assigned | Categorical |
| Transaction | Transaction Amount | Local currency transaction amount | Numeric |
| Transaction | Transaction Currency | Currency associated with transaction | Categorical |
| Transaction | Acquiring Bank | ICA of bank who acquired the transaction | Categorical |
| Transaction | Acquiring Country | Country where acquiring bank resides | Categorical |
| Transaction | Issuing Bank | ICA of bank who issued the card used in the transaction | Categorical |
| Transaction | Issuing Country | Country where issuing bank resides | Categorical |
| Transaction | Card Product Type | Program or service (for example, the financial network, financial program, or card program) with which the transaction is associated | Categorical |
| Transaction | Merchant Category Code | Classification of the merchant's type of business or service | Categorical |
| Transaction | E-Commerce Indicator | Identifies if the transaction was e-commerce | Binary |
| Transaction | Contactless Payment Indicator | Identifies if the transaction was contactless (NFC, PayPass, ApplePay, etc.) | Binary |
| Transaction | Recurring Transaction Indicator | Identifies if the transaction was a recurring subscription payment | Binary |
| Transaction | Cardholder Presence Indicator | Identifies if the cardholder was present during the transaction | Binary |

TABLE 1-continued

Factors used in scoring chargeback disputes include but are not limited to the following.

| Source | Factor | Description | Type |
|---|---|---|---|
| Transaction | Cross Border Indicator | Identifies if the card was issued in one country and the transaction was acquired in a different country | Binary |
| Transaction | Chargeback Reason Code | Indicates why the original transaction was charged back (first presentment) | Categorical |
| Transaction | Chargeback Date | Date the chargeback was initiated | Date |
| Transaction | Transaction Date | Date the transaction took place | Date |
| Transaction | Transaction Time | Time the transaction took place | Time |
| Account profile | Total Number of Previous Chargebacks by Each Chargeback Stage | Previous number of chargebacks for cardholder | Numeric |
| Account profile | Previous Chargeback Count Velocity by Each Chargeback Stage | Previous chargeback count velocity with different half-life cycles | Numeric |
| Account profile | Previous Chargeback Amount Velocity by Each Chargeback Stage | Previous chargeback amount velocity with different half-life cycles | Numeric |
| Account profile | Total Number of Recurring Transactions | Total count of recurring transactions | Numeric |
| Account profile | Recurring Transaction Count Velocity | Recurring transaction count velocity with different half-life cycles | Numeric |
| Account profile | Transaction Count Velocity by Merchant Category | Transaction count velocity with different half-life cycles | Numeric |
| Account profile | Transaction Amount Velocity by Merchant Category | Transaction amount velocity with different half-life cycles | Numeric |
| Account profile | CP Transaction Count Velocity | Card present transaction count velocity with different half-life cycles | Numeric |
| Account profile | CP Transaction Amount Velocity | Card present transaction amount velocity with different half-life cycles | Numeric |
| Account profile | CNP Transaction Count Velocity | Card not present transaction count velocity with different half-life cycles | Numeric |
| Account profile | CNP Transaction Amount Velocity | Card not present transaction amount velocity with different half-life cycles | Numeric |
| Account profile | Transaction Decline Count Velocity | Declined transaction count velocity with different half-life cycles | Numeric |
| Account profile | Transaction Decline Amount Velocity | Declined transaction amount velocity with different half-life cycles | Numeric |
| Account profile | Cardholder Residential Spending Area | Determines the residential area where the majority of the transactions take place | Categorical |
| Account profile | Cardholder Travel Count | Count of approved transactions outside of the cardholder's residential area | Numeric |
| Account profile | Fraud Chargeback Count | Count of fraud-related chargebacks | Numeric |
| Account profile | Account Data Comprise Count | Count of card presence in account data compromise database | Numeric |
| Account | Gambler Amount | Transaction amount at | Numeric |

TABLE 1-continued

Factors used in scoring chargeback disputes include but are not limited to the following.

| Source | Factor | Description | Type |
|---|---|---|---|
| profile | | gambling establishments | |
| Account profile | Cross Border ATM Amount | Dollar amount of approved ATM transactions that occurred cross border | Numeric |
| Account profile | Cross Border ATM Count | Count of approved ATM transactions that occurred cross border | Numeric |
| Account profile | Travel Spend Amount | Dollar amount of approved transactions that occurred while outside of residential area | Numeric |
| Account profile | Travel Spend Count | Count of approved transactions that occurred while outside of residential area | Numeric |

The DS computing device is also configured to extract account profile data about the account (e.g., a cardholder account) over the given period of time described above, as applicable. Table 1, above, shows various account profile data that may be extracted by a DS computing device for subsequent use in constructing the chargeback dispute prediction model. In some embodiments, extracted account profile data may include historical chargeback information and/or historical chargeback dispute information. In some embodiments, additionally or alternatively, historical chargeback and chargeback dispute information may be included in the extracted transaction data. As with the extracted transaction data factors, the account profile data factors listed in Table 1 may be characterized by various relevant transaction factors, and may be assigned a categorical type, binary type, or numerical type which may be used in rating/weighting each factor in the chargeback dispute prediction model.

The DS computing device is then configured to generate a chargeback dispute prediction model for the cardholder account based on the extracted transaction-based and profile-based information. The DS computing device uses the factors and types of extracted information, such as those shown in Table 1, to appropriately rate and/or weight the data to build a regularized logistic regression model. In some embodiments, generating the chargeback dispute prediction model includes dynamically adjusting the model to provide more weight to at least one type of data from among the transaction data or the account profile data, as determined to provide more accuracy to the model. In some embodiments, DS computing device is configured to continually refresh the generated model based on each subsequent candidate chargeback that is received in order to provide the most up-to-date information available for constructing the model. In some embodiments, after at least one candidate chargeback has received a chargeback dispute score and the dispute outcome is known, generating of the chargeback dispute prediction model may include dynamically adjusting the model to incorporate any previously scored chargeback disputes and their outcomes in order to provide more accuracy to the model.

In the example embodiment, the DS computing device is configured to receive a candidate chargeback for a transaction associated with the account. The candidate chargeback is the chargeback for which a score will be determined using the chargeback dispute prediction model. A candidate chargeback may be received in a chargeback message transmitted from the issuer to the merchant via the payment network. In some embodiments, issuers or merchants/acquirers enrolled in a chargeback dispute scoring service may enable DS computing device to intercept/receive each chargeback message from the payment network prior to merchant/acquirer receipt of the message. DS computing device may then extract relevant candidate chargeback and associated transaction data from the chargeback message, determine a score, and embed or otherwise incorporate the score into the chargeback message before sending it back to the issuer or along to the merchant/acquirer. In certain embodiments, a merchant/acquirer would receive notification of a chargeback and a dispute score in a single chargeback message. In other embodiments, a merchant/acquirer may receive a (score-less) chargeback message from the issuer via the payment network and decide on a case-by-case basis which chargebacks a score is desired. In these embodiments, information from the original (score-less) chargeback message, such as candidate chargeback and associated transaction data, as well as any relevant identifiers (e.g., account/cardholder identifiers), may be included in a score request that is sent from a merchant/acquirer to DS computing device. The DS computing device receives the score request, determines a score for the candidate chargeback, and transmits a score response to the merchant/acquirer that includes the chargeback dispute score. In some embodiments, when the DS computing device receives a score request, a chargeback dispute prediction model may already be available for the associated account, while in other cases a new model may need to be generated based on relevant account identifiers included in the score request.

In some embodiments, the score request may be received and the score response may be transmitted via the payment processing network (or chargeback network). In other embodiments, the score request may be received and the score response may be transmitted via a network other than the chargeback network (e.g., a communications network, a scoring network, a web network, or other Internet-based network). For instance, an issuer may wish to submit a score request over a web network or over a communications network (i.e., over a network separate from the payment/chargeback network), with the intent of obtaining 'pre-authentication' of a particular chargeback. In other words, by submitting a score request over a communication network, and receiving a score response over a communication network, an issuer can obtain a chargeback dispute score for a particular chargeback before formally serving the chargeback to the merchant via the chargeback network. For instance, if before formally serving the chargeback to the merchant, the issuer obtains a score which indicates a very high likelihood of the merchant winning a dispute of that chargeback (i.e., that the chargeback, if disputed by the merchant, will be favorable to the merchant and unfavorable to the issuer), the issuer may decide not to formally serve the chargeback at all. Conversely, if the issuer obtains a score indicating a very low likelihood of the merchant winning a dispute of that chargeback (i.e., that the chargeback, if disputed by the merchant, will be favorable to the issuer and unfavorable to the merchant), the issuer has essentially 'pre-authenticated' the chargeback and can proceed with serving the chargeback to the merchant over the payment/chargeback network. Utilization of a network other than the chargeback/payment processing network (e.g., a communications network) for score requests and responses can decrease bandwidth/usage of the chargeback network, thereby increasing speed and overall efficiency of the chargeback network.

In the example embodiment, the DS computing device is then configured to determine a chargeback dispute score for the candidate chargeback. The received candidate chargeback and associated transaction data is used as input for the chargeback dispute prediction model. The resulting score is indicative of the probability of winning the chargeback dispute without further proceedings (i.e., the probability of the issuer not submitting an arbitration chargeback) if the acquirer/merchant decides to dispute the chargeback with to the issuer. In the example embodiment, the chargeback dispute score is a numerical value wherein a higher value indicates a higher probability of winning a dispute against the candidate chargeback (where the result of a dispute by the merchant will be favorable to merchant, and the merchant will not have to cover the cost of the chargeback transaction). A lower score value indicates a lower probability of winning the dispute of the candidate chargeback (where the merchant will have to cover the cost of the chargeback transaction). For instance, the chargeback dispute score may range from 0 to 1, 0 to 10, 1-10, 0-100, 1-100, 0-1000, 1-1000, etc.

In some embodiments, the DS computing device is configured to transmit the chargeback dispute score to the merchant/acquirer associated with the candidate chargeback. As described herein, DS computing device may transmit the score automatically by embedding the score within each chargeback message, or manually in response to a score request received on a case-by-case basis. In some embodiments, additional information may be included with the transmitted score, such as the applicable dispute score range, the applicable time range considered by the model, an alert indicative of a particularly high or particularly low score, number of overall transactions considered, number of historical chargebacks considered, one or more of the most relevant and/or heavily weighted factors that contributed to the score, and the like.

The CDS system described herein, including the DS computing device, provides an objective, account-specific chargeback dispute score to merchants and acquirers based on weighted transaction and profile data factors.

The methods and systems described herein may be implemented using computer programming or engineering techniques including computer software, firmware, hardware, or any combination or subset therefor. At least one of the technical problems addressed by this system includes: (i) lack of perspective and prioritization for merchants (especially small business owners and new business owners) in knowing which chargebacks to dispute; (ii) lack of perspective and prioritization for issuers in knowing which chargebacks to submit (iii) inefficient chargeback dispute decision-making tools for merchants; (iv) waste of resources for issuers in pursuing chargebacks and for merchants in pursuing chargeback disputes that each is unlikely to win; (v) increased network traffic over the payment/chargeback network related to messages for unsuccessful chargeback submissions or disputes; and (vi) an overall decreased efficiency of the payment network.

The technical effect of the systems and methods described herein is achieved by performing at least one of the following steps: (i) extracting historical transaction data for a plurality of payment transactions associated with an account; (ii) extracting account profile data for the account used in the plurality of transactions, the account profile data comprising historical chargeback dispute information for the plurality of transactions associated with the account; (iii) generating a chargeback dispute prediction model for the account based on the extracted historical transaction data and the extracted account profile data; (iv) receiving a candidate chargeback for a transaction initiated with a merchant using the account; (v) extracting transaction data from the candidate chargeback; (vi) determining, using the generated chargeback dispute prediction model, a chargeback dispute score indicating a likelihood that the candidate chargeback (i) if disputed by the merchant, would result favorably for the merchant, or (ii) if submitted by the issuer, would result favorably for the issuer.

The resulting technical effect achieved by the systems and methods described herein is at least one of: (i) improved decision-making tools and perspective for issuers when submitting chargebacks; (ii) improved decision-making tools and perspective for merchants when disputing chargebacks; (iii) prioritization of chargebacks to submit or to dispute so that resources are more efficiently applied; (iv) resources retained by issuers or merchants in not submitting futile chargebacks or pursuing futile chargeback disputes, respectively; (v) reduced network processing, bandwidth, and storage requirements for chargebacks and chargeback dispute related messages; (vi) improved granularity of the analysis for the candidate chargeback by incorporating historical transaction and profile data into the chargeback dispute score prediction model and by rating/weighting transaction and profile data factors; (vii) improved searching and retrieval of transaction and account data by storing and classifying data and generated models according to specific protocols; (viii) enhanced chargeback messages (e.g., enhanced ISO 8583 messages) including a chargeback dispute prediction score for each candidate chargeback with optional alerts; and (ix) reduced network traffic over the payment processing network to improve overall efficiency of the network.

In one embodiment, a computer program is provided, and the program is embodied on a computer-readable medium. In an example embodiment, the CDS system is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T located in New York, N.Y.). The application is flexible and designed to run in various different environments without compromising any major functionality. In some embodiments, the CDS system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application to processing spending patterns in industrial, commercial, and residential applications.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram illustrating an example multi-party payment card system 100 for processing payment card transactions. The present disclosure relates to payment card system 100, such as a credit card payment system using the MasterCard® payment card system payment network 108 (also referred to as an "interchange" or "interchange network"). MasterCard® payment card system payment network 108 is a proprietary communications standard promulgated by MasterCard International Incorporated® for the exchange of financial transaction data between financial institutions that are members of MasterCard International Incorporated®. (MasterCard is a registered trademark of MasterCard International Incorporated located in Purchase, N.Y.).

In payment card system 100, a financial institution such as an issuer 110 issues a payment card for an account, such as a credit card account or a debit card account, to a cardholder 102, who uses the payment card to tender payment for a purchase from a merchant 104. To accept payment with the payment card, merchant 104 must normally establish an account with a financial institution that is part of the financial payment system. This financial institution is usually called the "merchant bank" or the "acquiring bank" or "acquirer bank" or simply "acquirer." When a cardholder 102 tenders payment for a purchase with a payment card (also known as a financial transaction card), merchant 104 requests authorization from acquirer 106 for the amount of the purchase. Such a request is referred to herein as an authorization request message. The request may be performed over the telephone, but is usually performed through the use of a point-of-interaction terminal, also referred to herein as a point-of-sale device, which reads the cardholder's account information from the magnetic stripe on the payment card and communicates electronically with the transaction processing computers of acquirer 106. Alternatively, acquirer 106 may authorize a third party to perform transaction processing on its behalf. In this case, the point-of-interaction terminal will be configured to communicate with the third party. Such a third party is usually called a "merchant processor" or an "acquiring processor."

For card-not-present (CNP) transactions, cardholder 102 provides payment information or billing data associated with the payment card electronically to merchant 104. The payment information received by merchant 104 is stored and transmitted to acquirer 106 and/or payment network 108 as part of an authorization request message. In some embodiments, merchant 104 transmits a plurality of authorization request messages together as a "batch" file to acquirer 106 and/or payment network 108.

Using payment card system payment network 108, the computers of acquirer 106 or the merchant processor will communicate with the computers of issuer 110, to determine whether the cardholder's account 112 is in good standing and whether the purchase is covered by the cardholder's available credit line or account balance. Based on these determinations, the request for authorization will be declined or accepted. If the request is accepted, an authorization code is issued to merchant 104.

When a request for authorization is accepted, the available credit line or available balance of cardholder's account 112 is decreased. Normally, a charge is not posted immediately to a cardholder's account because bankcard associations, such as MasterCard International Incorporated®, have promulgated rules that do not allow a merchant to charge, or "capture," a transaction until goods are shipped or services are rendered. When a merchant ships or delivers the goods or services, merchant 104 captures the transaction by, for example, appropriate data entry procedures on the point-of-interaction terminal. If a cardholder cancels a transaction before it is captured, a "void" is generated. If a cardholder returns goods after the transaction has been captured, a "credit" is generated.

For debit card transactions, when a request for authorization is approved by the issuer, cardholder's account 112 is decreased. Normally, a charge is posted immediately to cardholder's account 112. The bankcard association then transmits the approval to the acquiring processor for distribution of goods/services, information, or cash in the case of an ATM.

After a transaction is captured, the transaction is settled between merchant 104, acquirer 106, and issuer 110. Settlement refers to the transfer of financial data or funds between the merchant's account, acquirer 106, and issuer 110 related to the transaction. Usually, transactions are captured and accumulated into a "batch," which is settled as a group.

Figure 2:
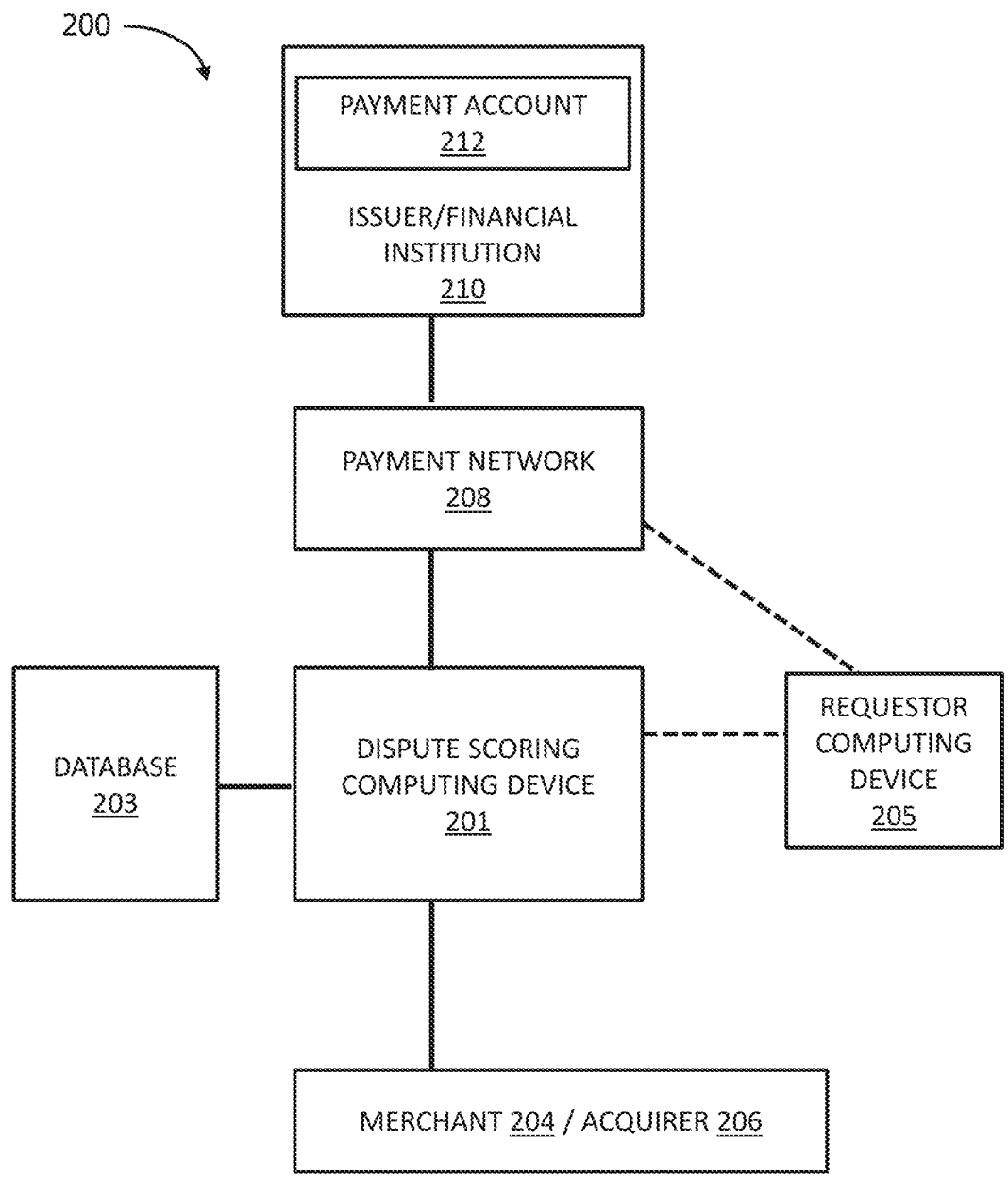

FIG. 2 is a block diagram of an example chargeback dispute scoring (CDS) system 200 including scoring engine (DS) computing device 201. DS computing device 201 includes at least one processor in communication with a memory. DS computing device 201 is in communication with a database (memory) 203, requestor computing device (s) 205, merchant 204 and/or acquirer 206, and issuer 210 via payment network 208 (e.g., a payment processor such as payment network 108, shown in FIG. 1). Database 203 contains information on a variety of matters, including: transaction-based data, account profile-based data, transaction-based factors, account profile-based factors, charge dispute prediction models, and/or any other information. In some embodiments, database 203 is stored on DS computing device 201. In alternative embodiments, database 203 is stored remotely from DS computing device 201 and may be non-centralized. CDS system 200 is communicatively coupled to system 100 (shown in FIG. 1) to provide data, such as transaction and account data, to CDS system 200.

In the example embodiment, payment network 208 is configured to transmit account-associated transaction and profile data to CDS system 200 to facilitate generating chargeback dispute prediction models and, in turn, chargeback dispute scores based on the generated models. In some embodiments, CDS system 200 extracts or retrieves the transaction data. In other embodiments, payment network 108 transmits the transaction data automatically to CDS system 200. In certain embodiments, the transaction data may be transmitted to CDS system 200 from another source, such as issuer 110.

In the example embodiment, CDS system 200 further includes a plurality of client subsystems, also referred to as client/user systems such as merchant 204 computing device, acquirer 206 computing device or requestor computing device 205. In the example embodiments, requestor computing device 205 is associated with a merchant and/or an acquirer and therefore similarly represent merchant 204 computing device and/or acquirer 206 computing device. As described in greater detail herein, merchant 204 and acquirer 206 computing devices may be associated with DS computing device 201 by enrolling in a dispute scoring service. Enrolled merchant 204 and acquirer 206 computing devices may receive a chargeback dispute score embedded by DS computing device 201 into every chargeback message received from issuer 210 via payment network 208. In some embodiments, merchant 204 and acquirer 206 computing devices may not be enrolled in the dispute scoring service, however, merchant 204 and/or acquirer 206 may represent a requestor computing device 205 by submitting score requests to DS computing device 201 on a case-by-case basis for individual candidate chargebacks. In alternative embodiments, requestor computing device 205 may be associated with an issuer or a different third party (e.g., a cardholder/user computing device). Computing devices 204, 205, 206 are computers including a web browser, such that DS computing device 201 is accessible to user computing devices 204, 205, 206 using the Internet. Computing devices 204, 205, 206 may be any device capable of interconnecting to the Internet including a mobile computing device, such as a laptop or desktop computer, a web-based phone (e.g., a "smartphone"), a personal digital assistant (PDA), a tablet or phablet, a fitness wearable device, a smart refrigerator or other web-connectable appliance, a "smart watch" or other wearable device, or other web-connectable equipment. Although one merchant 204/acquirer 206 and one requestor computing device 205 is shown in FIG. 2, it should be understood that CDS system 200 may include any number of merchants 204, acquirers 206 and/or requestor computing devices 205.

In one embodiment, DS computing device 201 is configured to communicate with a merchant 204, acquirer 206, or requestor computing device 205 associated with a merchant. Computing devices 204, 205, 206 are configured to display an app, for example, at a user interface (not shown) computing device 204, 205, 206. Merchants and/or acquirers may access the app to enroll in the chargeback dispute scoring service. In some embodiments, merchants 204 and/or acquirers 206 are automatically enrolled in the service. In such embodiments, the DS computing device 201 may be configured to enable the merchants 204 and/or acquirers 206 to opt-out of the service. Alternatively, merchants 204 and/or acquirers 206 may choose to represent a requestor computing device 205 and request a chargeback dispute score from DS computing device 201 on a case-by-case basis. In certain embodiments, the merchants 204 and/or acquirers 206 provide enrollment information to DS computing device 201 that facilitates generation of the chargeback dispute prediction model and determination of the chargeback dispute score. The enrollment information may be updated after enrollment. Once enrolled, the lending parties use the chargeback dispute scoring service to receive a chargeback dispute score associated with a candidate chargeback to determine whether or not to challenge/dispute the candidate chargeback with the issuer. In some embodiments, the app providing access to the chargeback dispute scoring service may have inter-app integration functionality, such that the chargeback dispute scoring services of the app may be integrated with, for example, chargeback dispute-initiating services of another application.

Database 203 is communicatively coupled to DS computing device 201. In other embodiments, database 203 is integrated with DS computing device 201 or payment network 208 (e.g., a payment processor). Database 203 is configured to receive, store, and transmit data for the chargeback dispute scoring service. In particular, database 203 may store transaction-based data, account profile-based data, transaction-based factors, account profile-based factors, charge dispute prediction models, candidate chargeback information, and chargeback-associated transaction data. The transaction-based data is associated with a plurality of transactions and is collected during the processing of the transactions by a payment network, such as payment network 108. In the example embodiment, the transaction data is associated with payment accounts 112 (such as payment cards (e.g., credit cards), and/or digital wallets) associated with issuer or financial institution 110. Transaction data may include, but is not limited to, a payment amount, an account identifier (e.g., a primary account number (PAN)), a cardholder identifier, a spending category, a timestamp associated with the transaction, and/or transaction-related data and factors such as those listed in Table 1. The cardholder data includes, for example, cardholder identifiers (such as PANs) that serve to identify one or more payment accounts 112 associated with a cardholder. Cardholder (i.e., account profile) data may also include other profile-based data and factors such as those listed in Table 1.

In the illustrated embodiment, DS computing device 201 is in communication with a payment network 208. Payment network 208 is configured to process financial transactions thereover. Payment network 208 is in communication with a plurality of issuers/financial institutions 210 (e.g., banks), although only one issuer 210 is shown for clarity. Financial institution 210 maintains one or more payment accounts 212 associated with a cardholder, such as a credit card account, debit account, or prepaid account. In the example embodiment, database 203 receives the transaction data from issuer 210 via payment network 208. Payment network 208 is a closed network (i.e., connection to payment network 208 requires permission from an administrator of the payment network 208). The payment network 208 is configured to facilitate generating, receiving, and/or transmitting messages associated with transactions for one or more merchants, issuers, and acquirers in communication with the payment network 208. In particular, the payment network is configured to facilitate generating, receiving, and/or transmitting messages associated with payment card transactions. The messages are formatted according to specific protocols associated with the network and include extractable data elements that payment network 208 is configured to analyze, extract, and classify to form the transaction data received by DS computing device 201. In one example, at least a portion of the transaction data is extracted from authorization request messages from the payment network 208, such as ISO® 8583 compliant messages and ISO® 20022 compliant messages. Cardholder data may also be retrieved from payment network 208. Alternatively, a different computing device may provide account profile data to database 203. In one example, the enrollment information provided during enrollment for the chargeback dispute scoring service may be stored as account profile data. In some embodiments, DS computing device 201 is in direct communication with financial institution 210 and extracts the transaction data and/or account profile directly therefrom, without the intervention of payment network 208.

Figure 3A:
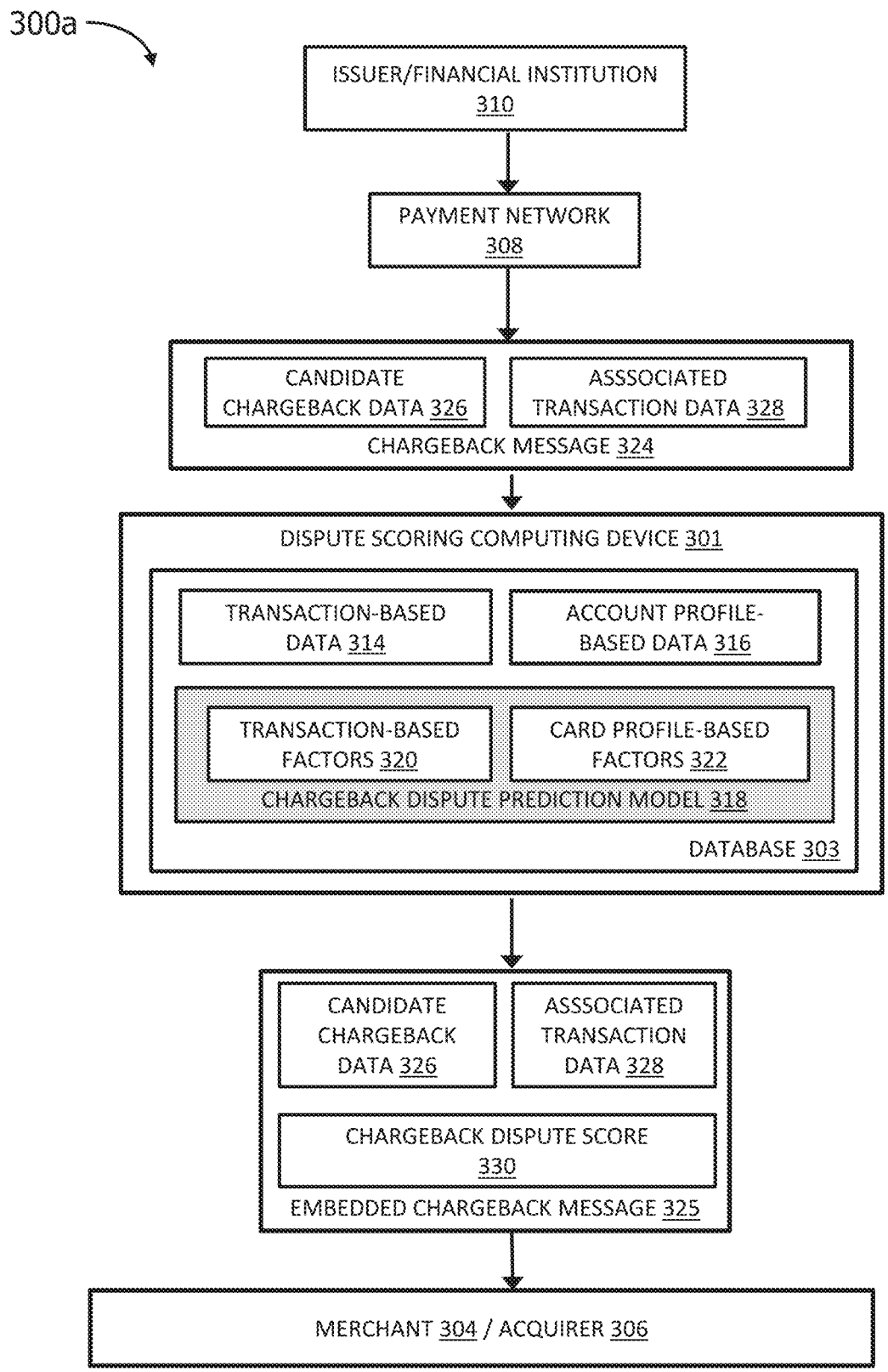
FIGS. 3A and 3B are example flow diagrams illustrating the flow of data between various components of the CDS system shown in FIG. 2.
Figure 3B:
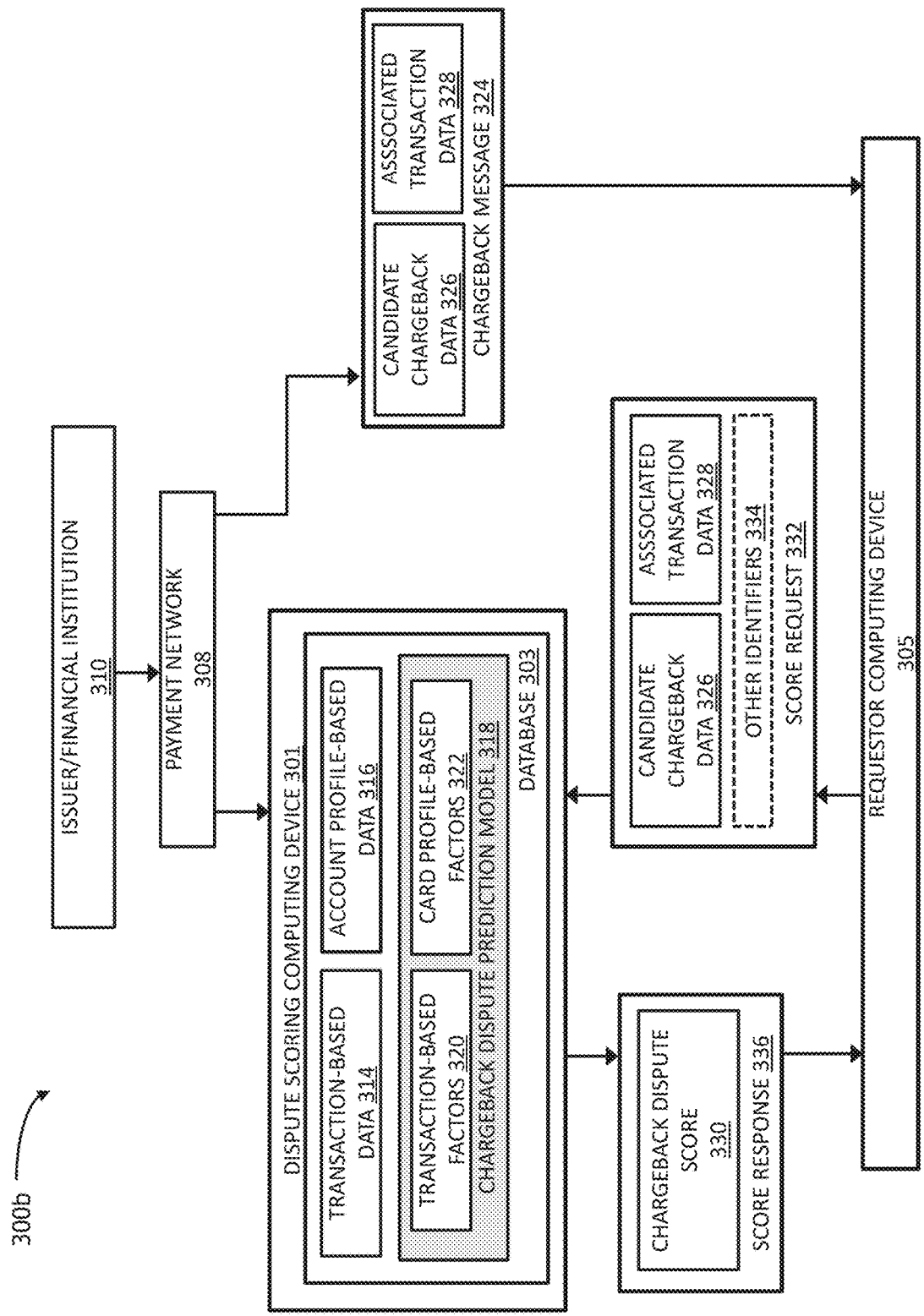

FIGS. 3A and 3B are data flow diagrams 300a and 300b, respectively, which illustrate the flow of various data between components of CDS system 200 (shown in FIG. 2). In particular, FIG. 3A depicts the data flow between merchant computing device 304 and/or acquirer computing device 306, DS computing device 301 (including database 303), and payment network 308. FIG. 3B depicts the data flow between a requestor computing device 305, DS computing device 301 (including database 303), and payment network 308. In other embodiments, CDS system 200 may provide additional, fewer, or alternative data, including those described elsewhere herein. As illustrated in FIGS. 2 and 3A-3B, database 203/303 may be a centralized database integral to DS computing device 201/301, or alternatively, a separate and external component.

With respect to FIG. 3A, in an example embodiment, DS computing device 301 is extracts transaction-based data 314 and account profile-based data 316 from issuer 310 via payment network 308. Transaction-based data 314 and account profile-based data 316 are then stored in database 303. Database 303 also includes charge dispute prediction model 318, constructed using the extracted transaction-based data 314 and account profile-based data 316, and by incorporating categorical, binary, and numeric types of transaction-based factors 320 and account profile-based factors 322 (as listed, for example, in Table 1). When issuer 310 initiates a chargeback for a particular transaction, a chargeback message 324 is used to notify merchant 304/acquirer 306.

In the example embodiment, merchant 304/acquirer 306 may be enrolled with DS computing device 301 to receive a chargeback dispute score 330 for each chargeback initiated by issuer 310. In these embodiments, DS computing device 301 is configured to receive chargeback message 324 prior to receipt of the message 324 by merchant 304/acquirer 306. Chargeback message 324 includes candidate chargeback data 326 as well associated transaction data 328 that relates to the transaction being charged back. Once intercepted/received at DS computing device 301, chargeback message 324 provides candidate chargeback data 326 and associated transaction data 328 as input for chargeback dispute prediction model 318. A chargeback dispute score 330 is determined from the model and chargeback message 324 input data, which is then appended to or embedded into the original chargeback message 324 to produce embedded chargeback message 325. Embedded chargeback message 325, which now includes score 330, is transmitted by DS computing device 301 to merchant 304/acquirer 306. In some embodiments, an alert may also be included within embedded chargeback message 325 along with the score 330. An alert may include an indicator or notification that the score has surpassed a particularly high or particularly low threshold value (e.g., less than 25% likely to succeed, less than 50% likely to succeed, more than 75% likely to succeed, more than 90% likely to succeed, etc.) as may be determined manually by the merchant 304/acquirer 306 during enrollment with the chargeback dispute scoring service or may be automatically determined by the DS computing device 301. For example, an alert may be generated when a determined chargeback dispute score satisfies one (or more) threshold rule(s) stored in the memory of DS computing device 301 (e.g., stored in database 303). In some embodiments, embedded chargeback message 325 may further include additional information related to score 330, as described elsewhere herein.

After merchant 304/acquirer 306 receives chargeback dispute score 330 (and any additionally-included information) from DS computing device 301 via embedded chargeback message 325, merchant 304/acquirer 306 analyzes the chargeback dispute score 330 to determine whether or not to dispute/challenge the candidate chargeback. In certain embodiments, merchant 304/acquirer 306 may automatically initiate a dispute of the candidate chargeback based on the chargeback dispute score 330 and/or additional information included with the score. That is, merchant 304 computing device and/or acquirer 306 computing device may store a set of instructions or rules for automatically initiating a dispute for a candidate chargeback based on a chargeback dispute score 330 (e.g., when the chargeback dispute score 330 is above a certain alert/threshold value determined by the merchant 304/acquirer 306) received from DS computing device 301.

With respect to FIG. 3B, in another example embodiment, merchant/acquirer may not be enrolled with DS computing device 301 to receive a chargeback dispute score 330 for each chargeback initiated by issuer 310. In these embodiments, merchant/acquirer may be represented by requestor computing device 305. Requestor computing device 305 receives a chargeback message 324 from the issuer 310 via the payment network 308. Requestor computing device 305 may then analyze candidate chargeback data 326 and associated transaction data 328 included in chargeback message 324, and decide on a case-by-case basis (i.e., a chargeback-to-chargeback basis) whether or not to obtain a chargeback dispute score 330 for a particular candidate chargeback. When requestor computing device 305 wishes to obtain a chargeback dispute score 330 for a particular candidate chargeback, requestor computing device 305 sends a score request 332 to DS computing device 301. Score request 332 includes information from chargeback message 324, such as candidate chargeback data 326 and associated transaction data 328, as well as other identifiers 334 that may be necessary for DS computing device 301 to compute a chargeback dispute score 330 for the candidate chargeback indicated in score request 332. For example, DS computing device 301 may require account identifiers in order to extract transaction and account profile data from issuer 310 via payment network 308, for the purpose of constructing a chargeback dispute prediction model 318 for the account associated with the candidate chargeback. Candidate chargeback data 326 and associated transaction data 328 are used as input for chargeback dispute prediction model 318, which determines a chargeback dispute score 330 for the candidate chargeback. Accordingly, in response to receiving score request 332 from requestor computing device 305, DS computing device 301 transmits a score response 336 back to requestor computing device 305 wherein the score response 336 includes the determined chargeback dispute score 330 for the candidate chargeback.

After requestor computing device 305 receives chargeback dispute score 330 (and any additionally-included information, such as an alert) from DS computing device 301 via score response 336, requestor computing device 305 analyzes the chargeback dispute score 330 to determine whether or not to dispute/challenge the candidate chargeback. In certain embodiments, requestor computing device 305 may automatically initiate a dispute of the candidate chargeback based on the chargeback dispute score 330 and/or additional information included with the score 330. That is, requestor computing device 305 may store a set of instructions or rules for automatically initiating a dispute for a candidate chargeback based on a chargeback dispute score (e.g., when the chargeback dispute score is above a certain alert/threshold value determined by the requestor) received from DS computing device 301.

Figure 4:
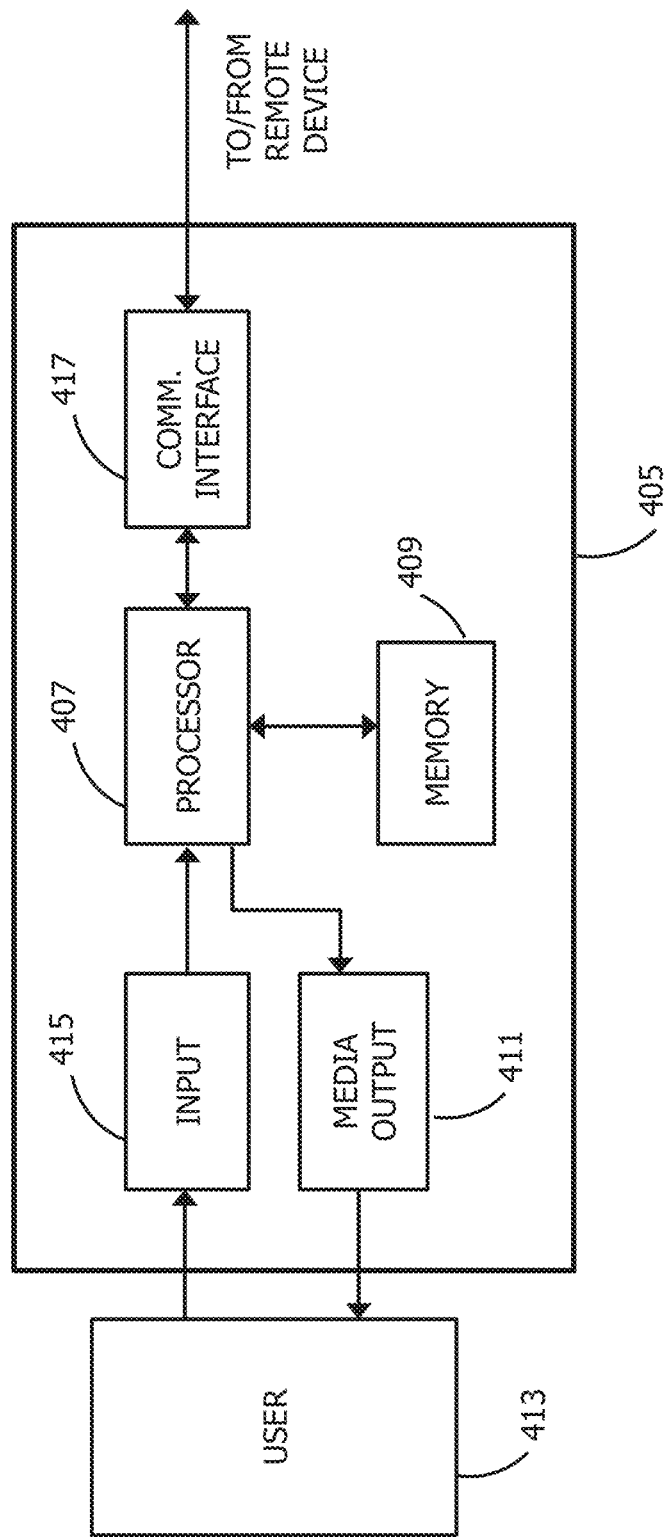

FIG. 4 depicts an exemplary configuration of a remote or user computing device 405, such as merchant 204, acquirer 206, and requestor computing device 205 (shown in FIG. 2). Computing device 405 includes a processor 407 for executing instructions. In some embodiments, executable instructions are stored in a memory area 409. Processor 407 may include one or more processing units (e.g., in a multi-core configuration). Memory area 409 is any device allowing information such as executable instructions and/or other data to be stored and retrieved. Memory area 409 may include one or more computer-readable media.

Computing device 405 also includes at least one media output component 411 for presenting information to a user 413. Media output component 411 is any component capable of conveying information to user 413. In some embodiments, media output component 411 includes an output adapter such as a video adapter and/or an audio adapter. An output adapter is operatively coupled to processor 407 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones). In some embodiments, media output component 411 is configured to present an interactive user interface (e.g., a web browser or client application) to user 413.

In some embodiments, computing device 405 includes an input device 415 for receiving input from user 413. Input device 415 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 411 and input device 415.

Computing device 405 may also include a communication interface 417, which is communicatively coupleable to a remote device such as DS computing device 201 (shown in FIG. 2). Communication interface 417 may include, for example, a wired or wireless network adapter or a wireless data transceiver for use with a mobile phone network (e.g., Global System for Mobile communications (GSM), 3G, 4G, or Bluetooth) or other mobile data network (e.g., Worldwide Interoperability for Microwave Access (WIMAX)).

Stored in memory area 409 are, for example, computer-readable instructions for providing a user interface to user 413 via media output component 411 and, optionally, receiving and processing input from input device 415. A user interface may include, among other possibilities, a web browser and client application. Web browsers enable users 413 to display and interact with media and other information typically embedded on a web page or a website from a web server associated with, for example, a merchant. A client application allows users 413 to interact with a server application associated with, for example, DS computing device 201 and/or other components of CDS system 200 (shown in FIG. 2).

Figure 5:
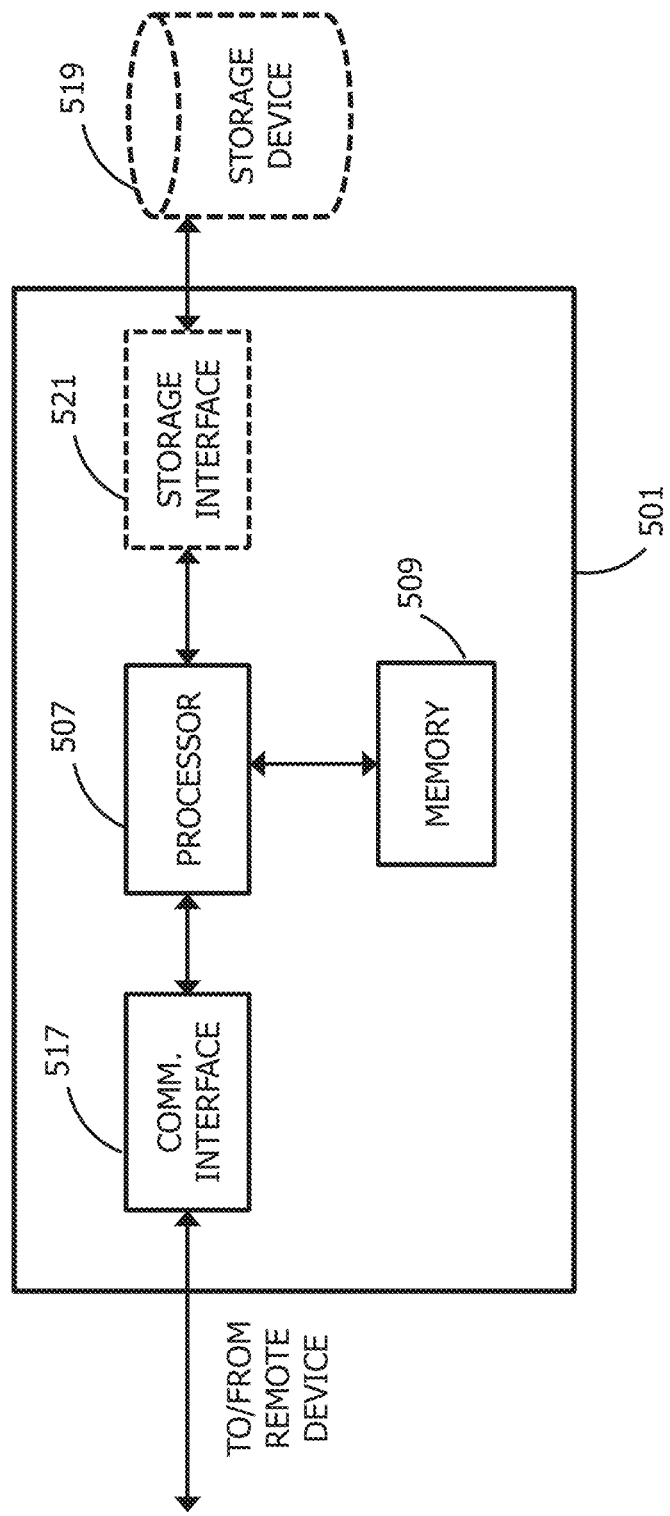

FIG. 5 illustrates an example configuration of a server computing device 501, such as DS computing device 201 and payment network 208 (shown in FIG. 2). Server computing device 501 includes a processor 507 for executing instructions. Instructions may be stored in a memory area 509, for example. Processor 507 may include one or more processing units (e.g., in a multi-core configuration).

Processor 507 is operatively coupled to a communication interface 517 such that server computing device 501 is capable of communicating with a remote device such as computing device 405 shown in FIG. 4 or another server computing device 501. For example, communication interface 517 may receive requests from requestor computing device 205 via the Internet, as illustrated in FIG. 2.

Processor 507 may also be operatively coupled to a storage device 519. Storage device 519 is any computer-operated hardware suitable for storing and/or retrieving data. In some embodiments, storage device 519 is integrated in server computing device 501. For example, server computing device 501 may include one or more hard disk drives as storage device 519. In other embodiments, storage device 519 is external to server computing device 501 and may be accessed by a plurality of server computing devices 501. For example, storage device 519 may include multiple storage units such as hard disks or solid state disks in a redundant array of inexpensive disks (RAID) configuration. Storage device 519 may include a storage area network (SAN) and/or a network attached storage (NAS) system.

In some embodiments, processor 507 is operatively coupled to storage device 519 via a storage interface 521. Storage interface 521 is any component capable of providing processor 507 with access to storage device 519. Storage interface 521 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 507 with access to storage device 519.

Memory areas 409 (shown in FIG. 4) and 509 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are for example only, and are thus not limiting as to the types of memory usable for storage of a computer program.

Figure 6:
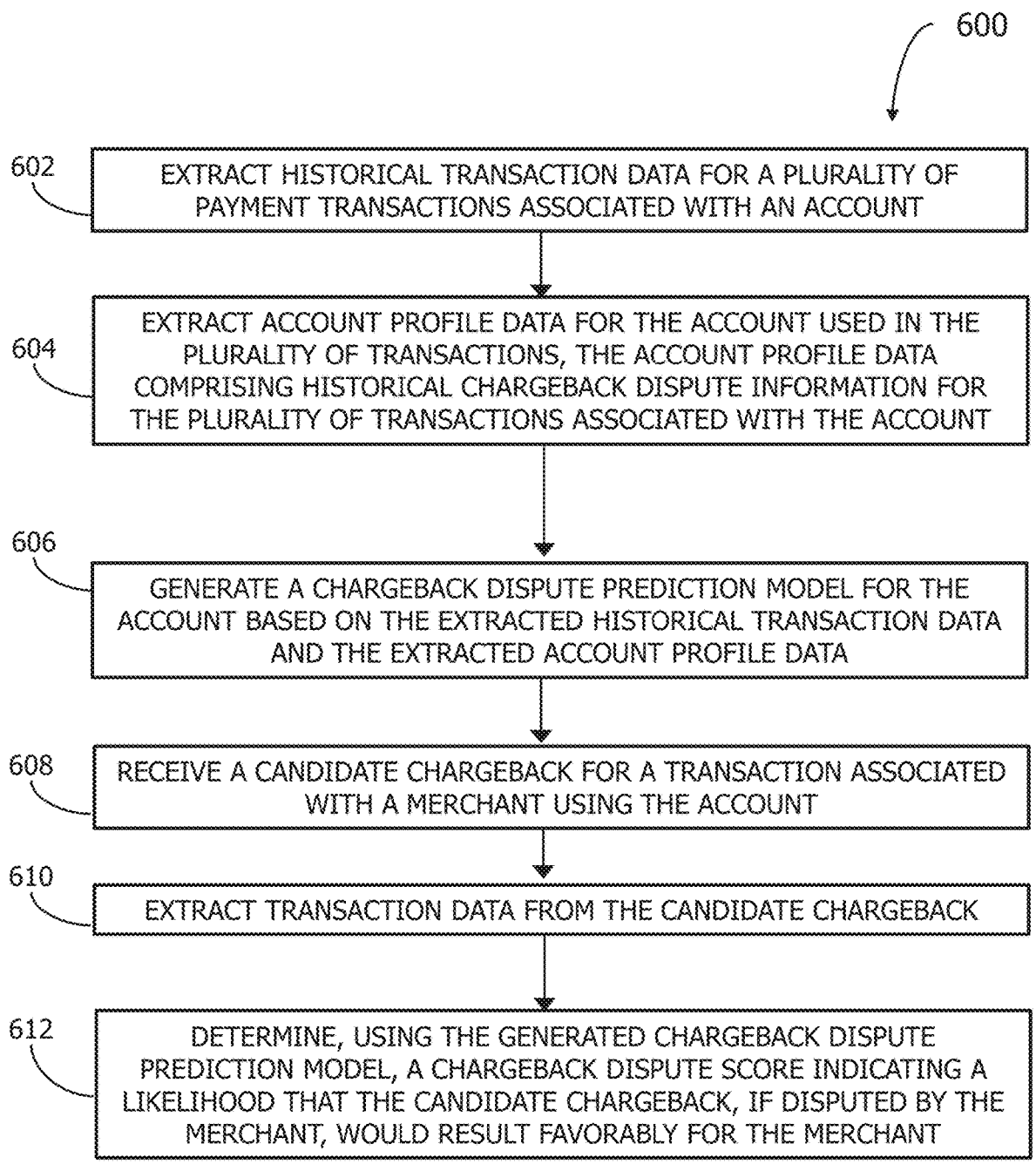

FIG. 6 is a flowchart of a method 600 for scoring a chargeback dispute using a CDS system, such as system 200 (shown in FIG. 2). In the example embodiment, method 600 is performed by a DS computing device, such as DS computing device 201 (shown in FIG. 2). In certain embodiments, method 600 may be at least partially performed by a different computing device. In other embodiments, method 600 may include additional, fewer, or alternative actions, including those described elsewhere herein.

Method 600 begins with the DS computing device extracting 602 historical transaction data for a plurality of payment transactions associated with an account (such as a cardholder account). The DS computing device also extracts 604 account profile data for the account used in the plurality of transactions. The account profile data comprises historical chargeback dispute information for the plurality of transactions associated with the account. The DS computing device further generates 606 a chargeback dispute prediction model for the account based on the extracted historical transaction data and the extracted account profile data.

The DS computing device then receives 608 a candidate chargeback for a transaction associated with a merchant using the account. The DS computing device also extracts 610 transaction data from the candidate chargeback. The DS computing device determines 612, using the generated chargeback dispute prediction model, a chargeback dispute score indicating a likelihood that the candidate chargeback, if disputed by the merchant, would result favorably for the merchant. In the example embodiment, a favorable result for the merchant includes that the merchant would not be responsible for any of the cost associated with the chargeback transaction. Alternatively, a favorable result for the merchant includes that the merchant may be partially responsible for the cost of the chargeback transaction (e.g., responsible for a partial amount), but would not be responsible for the entire transaction amount.

The chargeback dispute score is determined based at least in part on the generated chargeback prediction model and the extracted information from the candidate chargeback and the associated transaction. The DS computing device then transmits the chargeback dispute score to the merchant/acquirer associated with the transaction that was charged back. In some embodiments, each candidate chargeback associated with a particular account is received in a chargeback message from the payment network, the DS computing device embeds or otherwise includes the determined chargeback dispute score in the chargeback message, and the embedded chargeback message is transmitted to the merchant/acquirer. In other embodiments, a candidate chargeback is received on a case-by-case basis via a score request from a merchant/acquirer requestor computing device and the DS computing device transmits a score response back to the requestor computing device, wherein the score response includes the determined chargeback dispute score for the candidate chargeback identified in the request. In the example embodiments described herein, the score is intended for, and accordingly transmitted to, a merchant and/or acquirer. In alternative embodiments, a chargeback dispute score may be transmitted to a requestor computing device that is not associated with a merchant/acquirer, such as an issuer involved in the chargeback process of a particular candidate chargeback dispute who wishes to obtain the probability score, or the like.

Figure 7:
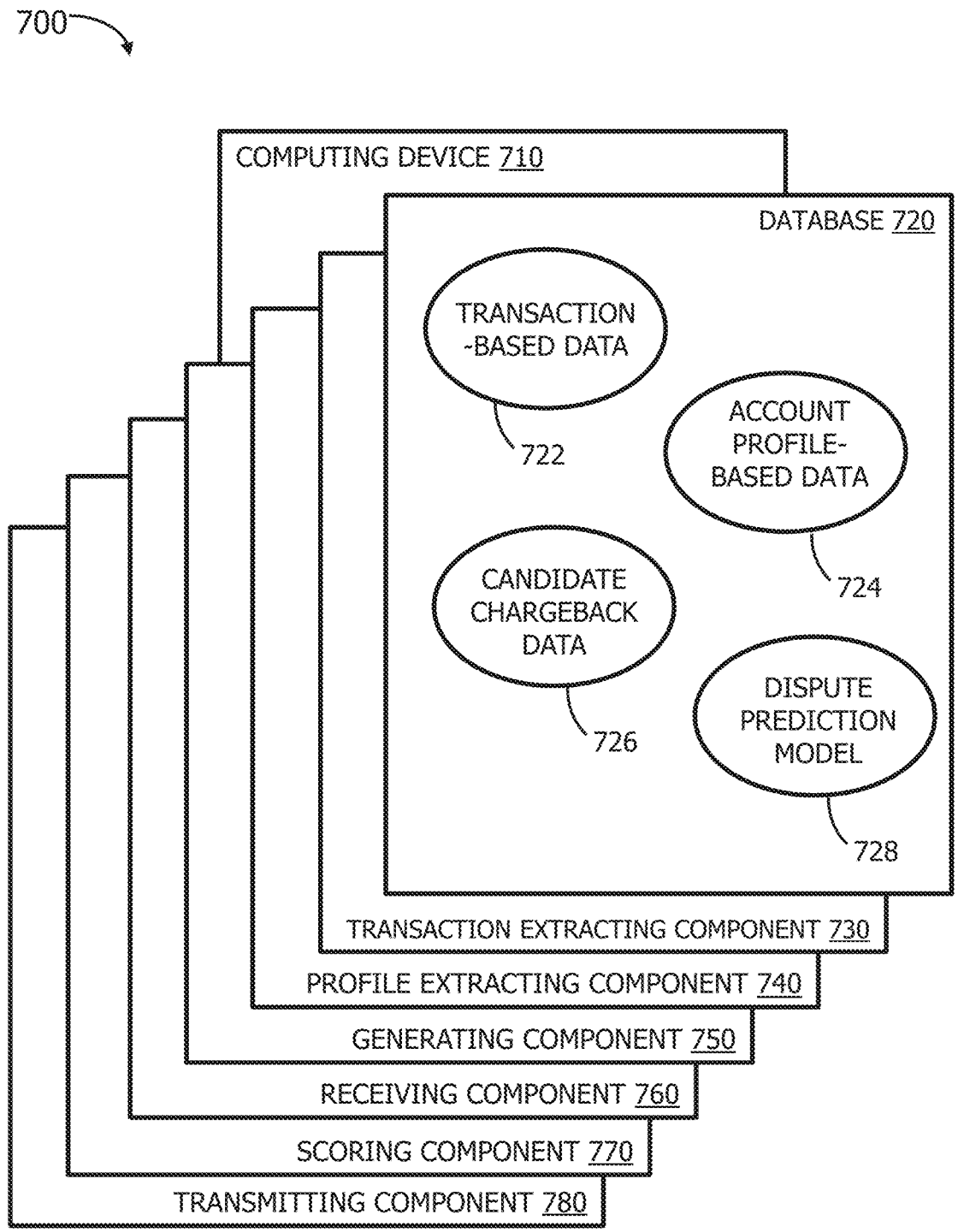

FIG. 7 is a diagram 700 of components of an example computing device 710 that may be used in method 600 shown in FIG. 6. In some embodiments, computing device 710 is similar to DS computing device 201 (shown in FIG. 2). Computing device 710 includes a database 720 configured to store various information. Database 720 may be similar to database 203 (shown in FIG. 2). Database 720 may be coupled with several separate components within computing device 710, which perform specific tasks. In the illustrated embodiment, database 720 is divided into a plurality of sections and stores, including but not limited to, a transaction-based data section 722 (which may include and/or be similar to transaction-based data 314, FIGS. 3A and 3B), an account profile-based data section 724 (which may include and/or be similar to account profile-based data 316, shown in FIGS. 3A and 3B), a candidate chargeback data section 726 (which may include associated transaction data 328 and/or be similar to candidate chargeback data 326, shown in FIGS. 3A and 3B), and a dispute prediction model section 728 (which may include transaction-based factors 320 and account profile-based factors 322, and/or be similar to charge dispute prediction model 318, FIGS. 3A and 3B). Database 720 is interconnected to computing device 710 to update, refresh, and/or extract the information as required.

In the example embodiment, computing device 710 includes a transaction extracting component 730 configured to extract transaction data about a plurality of transactions authorized by an account. Computing device 710 further comprises a profile extracting component 740 configured to extract account profile data about the account which may include historical chargeback and chargeback dispute information. Computing device 710 further includes a generating component 750 configured to generate a chargeback dispute prediction model based on the extracted transaction and account profile data. Computing device 710 also comprises a receiving component 760 configured to receive a candidate chargeback for a transaction associated with the account. Receiving component 760 is also configured to extract information regarding the chargeback and its associated transaction from the received candidate chargeback. Computing device 710 also includes a scoring component 770 configured to determine a chargeback dispute score indicating a likelihood that a dispute of the candidate chargeback will result in a favorable outcome for a merchant associated with the candidate chargeback. Scoring component 770 determines the chargeback dispute score based at least in part on the generated chargeback dispute prediction model and the extracted information from the received candidate chargeback and associated transaction. Computing device 710 additionally includes a transmitting component 780 configured to transmit the determined chargeback dispute score to the merchant/acquirer associated with the candidate chargeback.

Described herein are computer systems such as a payment processor (such as a payment network), a requestor computing device, and a DS computing device. As described herein, all such computer systems include a processor and a memory.

Further, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

The term processor, as used herein, refers to central processing units, microprocessors, microcontrollers, reduced instruction set circuits (RISC), application specific integrated circuits (ASIC), logic circuits, and any other circuit or processor capable of executing the functions described herein. The above examples are for example only, and are thus not intended to limit in any way the definition and/or meaning of the term "processor."

The term database, as used herein, refers to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

As used herein, the terms "software" and "firmware" are interchangeable, and include any computer program stored in memory for execution by a processor (e.g., 407, 507), including RAM memory, ROM memory, EPROM memory, EEPROM memory, and non-volatile RAM (NVRAM) memory. The above memory types are example only, and are thus not limiting as to the types of memory usable for storage of a computer program.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, smartphones, personal digital assistants (PDAs), key fobs, and/or computers. Each type of transaction card can be used as a method of payment for performing a transaction.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

In addition, although various elements of the DS computing device are described herein as including general processing and memory devices, it should be understood that the DS computing device is a specialized computer configured to perform the steps described herein for determining chargeback dispute scores that indicate a probability that a dispute of a candidate chargeback will result in a favorable outcome for a merchant/acquirer based a generated chargeback dispute prediction model and the candidate chargeback information.

This written description uses examples, including the best mode, to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A chargeback dispute scoring system comprising a payment network server and a dispute scoring computing device, the dispute scoring device including a processor in communication with a memory, said processor programmed to:
   extract historical transaction data for a plurality of payment transactions associated with an account;
   extract account profile data for the account used in the plurality of transactions, the account profile data comprising historical chargeback dispute information for the plurality of transactions associated with the account;
   generate a chargeback dispute prediction model for the account based on the extracted historical transaction data and the extracted account profile data;
   receive over a communications network a candidate chargeback for a transaction initiated with a merchant using the account;
   extract transaction data from the candidate chargeback;
   determine, using the generated chargeback dispute prediction model, a chargeback dispute score indicating a likelihood that the candidate chargeback, if disputed by the merchant, would result favorably for the merchant;
   generate an alert in response to the determined chargeback dispute score satisfying a threshold rule stored in the memory; and,
   transmit over the communications network the alert to at least one of the merchant and an issuer, wherein said payment network server receives via a payment interchange network one of:
      a first presentment of a chargeback for the transaction, in response to the chargeback dispute score indicating a low likelihood of the favorable result for the merchant; and
      a dispute of a formal presentment of the chargeback for the transaction, in response to the chargeback dispute score indicating a high likelihood of the favorable result for the merchant.

2. The dispute scoring system of claim 1, wherein the candidate chargeback is received as part of a score request transmitted over the communications network separate from the payment interchange network, and wherein said processor is further programmed to:
   embed the chargeback dispute score within a score response; and
   transmit the score response including the embedded chargeback dispute score.

3. The dispute scoring system of claim 2, wherein the score request is received over the communications network from a merchant, and the score response including the embedded chargeback dispute score is transmitted over the communications network to the merchant in response to the score request such that the scoring of the candidate chargeback is first processed over the chargeback network.

4. The dispute scoring system of claim 2, wherein the score request is received over the communications network from an issuer, and the score response including the embedded chargeback dispute score is transmitted over the communications network to the issuer in response to the score request.

5. The dispute scoring system of claim 1, wherein the generating of the chargeback dispute prediction model comprises dynamically adjusting the chargeback dispute prediction model to provide more weight to at least one type of data from among the transaction data or the account profile data that is determined to provide more accuracy to the chargeback dispute prediction model.

6. The dispute scoring system of claim 1, wherein said processor is further programmed to continually refresh the chargeback dispute prediction model based on each subsequent candidate chargeback that is received.

7. The dispute scoring system of claim 1, wherein the generating of the chargeback dispute prediction model comprises dynamically adjusting the chargeback dispute prediction model to incorporate previously scored chargeback disputes and their outcomes to provide more accuracy to the chargeback dispute prediction model.

8. A method for scoring a chargeback dispute associated with a transaction, said method performed using a payment network server and a dispute scoring computing device, the dispute scoring device including a processor in communication with a memory, said method comprising:

extracting historical transaction data for a plurality of payment transactions associated with an account;

extracting account profile data for the account used in the plurality of transactions, the account profile data comprising historical chargeback dispute information for the plurality of transactions associated with the account;

generating a chargeback dispute prediction model for the account based on the extracted historical transaction data and the extracted account profile data;

receiving over a communications network a candidate chargeback for a transaction initiated with a merchant using the account;

extracting transaction data from the candidate chargeback;

determining, using the generated chargeback dispute prediction model, a chargeback dispute score indicating a likelihood that the candidate chargeback, if disputed by the merchant, would result favorably for the merchant;

generating an alert in response to the determined chargeback dispute score satisfying a threshold rule stored in the memory; and, transmitting over the communications network the alert to at least one of the merchant and an issuer, wherein the payment network server receives via a payment interchange network one of:
 a first presentment of a chargeback for the transaction, in response to the chargeback dispute score indicating a low likelihood of the favorable result for the merchant; and
 a dispute of a formal presentment of the chargeback for the transaction, in response to the chargeback dispute score indicating a high likelihood of the favorable result for the merchant.

9. The method of claim 8, wherein receiving the candidate chargeback comprises receiving a score request transmitted over the communications network separate from the payment interchange network, the score request including the candidate chargeback, and wherein the method further comprises:
 embedding the chargeback score within a score response; and
 transmitting the score response including the embedded chargeback dispute score.

10. The method of claim 9, wherein the score request is received over the communications network from a merchant, and the score response including the embedded chargeback dispute score is transmitted over the communications network to the merchant responsive to the score request such that the scoring of the candidate chargeback is first processed over the chargeback network.

11. The method of claim 9, wherein the score request is received over the communications network from an issuer, and the score response including the embedded chargeback dispute score is transmitted over the communications network to the issuer responsive to the score request.

12. The method of claim 8, wherein the generating of the chargeback dispute prediction model comprises dynamically adjusting the chargeback dispute prediction model to provide more weight to at least one type of data from among the transaction data or the account profile data that is determined to provide more accuracy to the chargeback dispute prediction model, and wherein the method further comprises continually refreshing the chargeback dispute prediction model based on each subsequent candidate chargeback that is received.

13. The method of claim 8, wherein the generating of the chargeback dispute prediction model comprises dynamically adjusting the chargeback dispute prediction model to incorporate previously scored chargeback disputes and their outcomes to provide more accuracy to the chargeback dispute prediction model.

14. A non-transitory computer-readable storage medium having computer-executable instructions embodied thereon, wherein when executed by a payment network server and a dispute scoring (DS) computing device, the dispute scoring device including at least one processor coupled to a memory, the computer-executable instructions cause the DS computing device to:
 extract historical transaction data for a plurality of payment transactions associated with an account;
 extract account profile data for the account used in the plurality of transactions, the account profile data comprising historical chargeback dispute information for the plurality of transactions associated with the account;
 generate a chargeback dispute prediction model for the account based on the extracted historical transaction data and the extracted account profile data;
 receive over a communications network a candidate chargeback for a transaction initiated with a merchant using the account; wastefulness
 extract transaction data from the candidate chargeback;
 determine, using the generated chargeback dispute prediction model, a chargeback dispute score indicating a likelihood that the candidate chargeback, if disputed by the merchant, would result favorably for the merchant;
 generate an alert in response to the determined chargeback dispute score satisfying a threshold rule stored in the memory; and,
 transmit over the communications network the alert to at least one of the merchant and an issuer, wherein when executed by the payment network server, the instructions cause the payment network server to receive via a payment interchange network one of:
  a first presentment of a chargeback for the transaction, in response to the chargeback dispute score indicating a low likelihood of the favorable result for the merchant; and
  a dispute of a formal presentment of the chargeback for the transaction, in response to the chargeback dispute score indicating a high likelihood of the favorable result for the merchant.

15. The non-transitory computer-readable storage claim 14, wherein the candidate chargeback is received as part of a score request transmitted over the communications network separate from the payment interchange network, and wherein the computer-executable instructions further cause the DS computing device to:
 embed the chargeback dispute score within a score response; and
 transmit the score response including the embedded chargeback dispute score.

16. The non-transitory computer-readable storage media of claim 15, wherein the score request is received over the communications network from the merchant, and the score response is transmitted over the communications network to the merchant in response to the score request such that the scoring of the candidate chargeback is first processed over the chargeback network.

17. The non-transitory computer-readable storage media of claim 15, wherein the score request is received over the communications network from an issuer, and the score response is transmitted over the communications network to the issuer in response to the score request.

18. The non-transitory computer-readable storage media of claim 14, wherein the generating of the chargeback dispute prediction model comprises dynamically adjusting the chargeback dispute prediction model to provide more weight to at least one type of data from among the transaction data or the account profile data that is determined to provide more accuracy to the chargeback dispute prediction model, and wherein the computer-executable instructions further cause the DS computing device to continually refresh the chargeback dispute prediction model based on each subsequent candidate chargeback that is received.

19. The non-transitory computer-readable storage media of claim 14, wherein the generating of the chargeback dispute prediction model comprises dynamically adjusting the chargeback dispute prediction model to incorporate previously scored chargeback disputes and their outcomes to provide more accuracy to the chargeback dispute prediction model.

\* \* \* \* \*